May 7, 1957  A. G. GOLDBERG  2,791,046
DISPLAY DEVICE HOLDER

Filed Feb. 17, 1954  2 Sheets-Sheet 1

INVENTOR.
Abraham G. Goldberg.
BY
Heard, Smith, Porter & Chittick

May 7, 1957 — A. G. GOLDBERG — 2,791,046
DISPLAY DEVICE HOLDER

Filed Feb. 17, 1954 — 2 Sheets-Sheet 2

INVENTOR.
Abraham G. Goldberg.
BY
Heard, Smith, Porter & Chittick

United States Patent Office 2,791,046
Patented May 7, 1957

2,791,046
DISPLAY DEVICE HOLDER

Abraham G. Goldberg, Chestnut Hill, Mass.

Application February 17, 1954, Serial No. 410,947

1 Claim. (Cl. 40—10)

This invention relates to a holder for a display device which may be a number plate for an automobile, advertising member, an ornamental design, etc., and the invention relates particularly to that type of holder which includes a backing plate adapted to be secured to any suitable support, and a frame adapted to receive the display device and which is pivoted to the lower edge of the backing plate and is adapted to swing from an open position, in which the display device may be placed within the frame or removed therefrom, to a closed position in which the display device is confined between the frame and the backing plate, said frame having a window through which the display device can be seen when the frame is closed.

One object of the present invention is to provide novel means for supporting the display device on the backing plate.

Another object of the invention is to provide a display device holding means which is constructed to hold or support display devices of different sizes and shapes.

These and other objects and many of the attendant advantages of this invention will be readily appreciated as the same becomes better understood by reference to the following detailed description when considered in connection with the accompanying drawings wherein.

Figure 1:
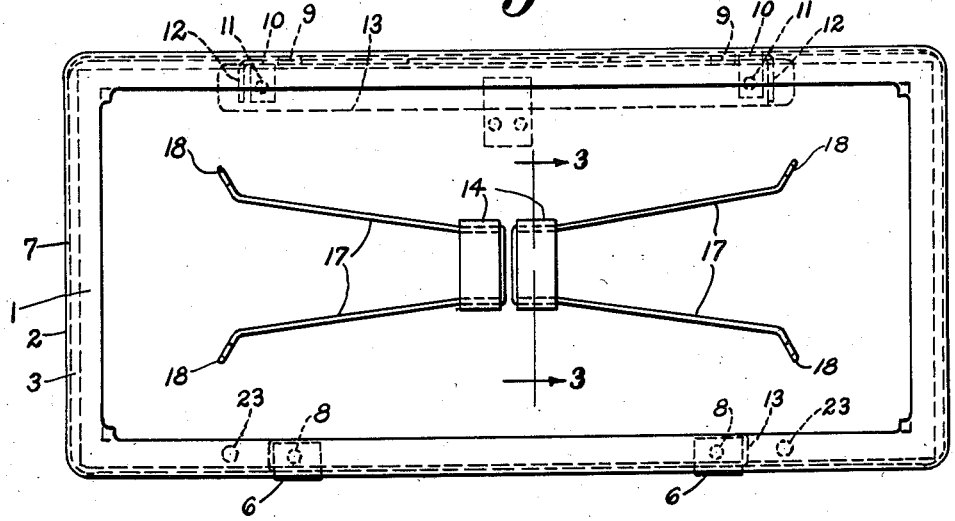
Fig. 1 is a front view of the display device holder embodying this invention.

The present invention is an improvement on the display device holder shown and described by me in my prior United States Patent No. 2,073,403, issued March 9, 1937, a particular improvement residing in the use of novel means for detachably securing a display device to the backing plate of a display device holder.

More specifically the device comprises a rectangular frame of angle bar construction having a face flange 1 and a peripheral flange 2. Nesting within the frame is a transparent pane 3, e. g. of plastic or glass, which is provided on its rear side with a resilient cushioning member 4 whose outer periphery coincides with the outer periphery of the pane. While not shown, it is obvious that a second resilient cushion may be provided on the opposite side of pane 3 to cushion it against the frame, and to assure sealing from dust and moisture, the face flange may be offset inwardly to provide a seating area for the second cushioning member in order to bring the inside edge of face flange 1 in close proximity to pane 3.

The frame is pivotally secured at 6 to a backing plate 7 which is provided with novel means hereinafter described for releasably holding a display device. Hinges 6 may be secured to the backing plate and the frame by rivets 8, or other conventional means. The frame is provided with tabs 9 which are so positioned as to be in axial alinement with complementary tabs 10 on backing plate 7 when the frame and backing plate are brought together. L-wires 12 are provided to securely lock the backing plate to the frame, these wires frictionally fitting within the eyes of the alined tabs 9 and 10. In order to provide support for the backing plate in the vicinity of tabs 10 and hinges 6, supporting bars 13 may be secured to the backing plate, as illustrated in Figs. 1 and 2.

The backing plate 7 has secured to its front face novel means for adjustably supporting the display device. Such means comprises two identical U-shaped spring wire supporting elements 17, the two supporting elements 17 of each device being connected at one end by a bridge portion 30 and having hook portions 18 at their free ends.

Figure 3:
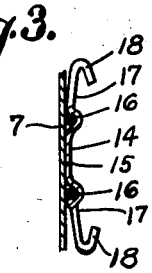
Fig. 3 is a vertical sectional view of a portion of the backing plate illustrating the manner in which the retaining elements are mounted to the backing plate, the view being taken on line 3—3 of Fig. 1.

These display devices supporting elements are secured to the backing plate 7 by means of clamping plates 14. Each clamping member 14 is in the form of a flat plate having a flat central portion 15 which rests against the face of the backing member between the two arms 17 and adjacent to the bridge portion 30. Said clamping member may be rigidly secured to the backing plate by any suitable means, as by means of rivets or bolts. The top and bottom edges of each clamping member are deformed to embrace and partially encircle the arms 17 of the supporting member, as clearly seen in Fig. 3.

Figure 2:
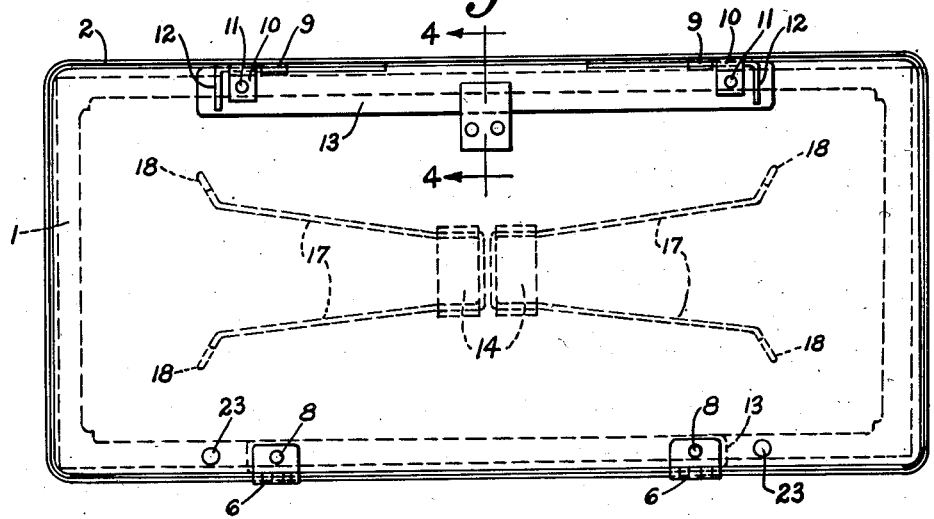
Fig. 2 is a rear view of the same.

The two display device supporting members 17 are arranged so that their arms project in opposite directions, as shown clearly in Fig. 1, and the two clamping members 14 are located closely adjacent each other at the central portion of the backing plate. As illustrated in Fig. 1, the bridge portion 30 of each supporting member extends along the vertical side of the clamping member.

By this means each supporting member 17 is rigidly held to the backing plate, but the arms of said supporting member are free to spread more or less as necessary to accommodate display devices of different sizes.

Figure 4:
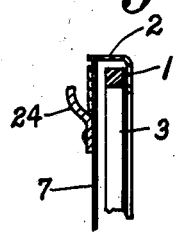
Fig. 4 is a vertical section taken along the line 4—4 of Fig. 2.
Figure 5:
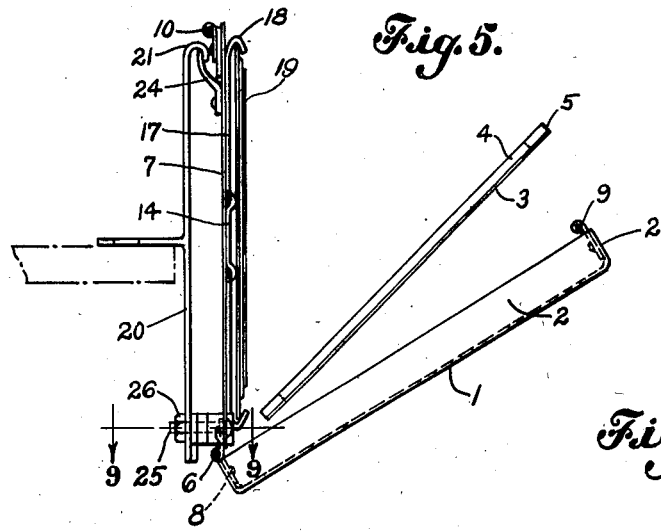
Fig. 5 is a side view of the invention in an open position with the transparent pane spaced from the frame.
Figure 9:
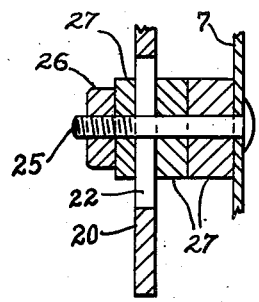

The complete holder assembly may be mounted on a suitable surface by various means. Illustrated in Figs. 4 and 5 is a preferred device for supporting the holder of this invention. The supporting means comprises a T-bracket 20 having a curved lip portion 21 and slots 22. Holes are provided adjacent one edge of the backing plate 7 to accommodate bolts or fasteners which extend through slots 22 of T-bracket 20. The holes in backing plate 7 are shown at 23 in Figs. 1, 2, and 6. Also mounted on backing plate 7 is a member 24 having an offset lug portion spaced from backing plate 7. This lug portion engages lip 21 of T-bracket 20, and bolts 25 and nuts 26 cooperate with the lug portion to hold the backing plate to the bracket. As shown in Figs. 5 and 9, spacers or washers 27 are provided on bolts 25 to space backing plate 7 from bracket 20.

Figure 6:
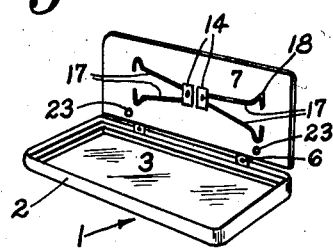
Fig. 6 is a perspective view of the invention in an open position.
Figure 7:
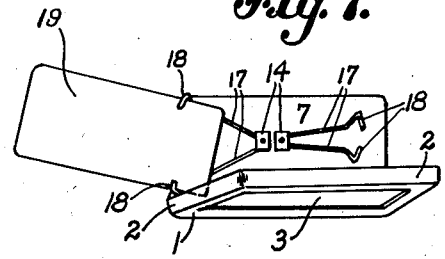
Fig. 7 is a perspective view of the invention illustrating the manner of inserting a display device.
Figure 8:
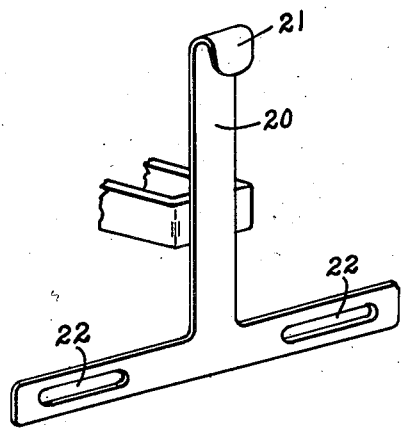
Fig. 8 is a perspective view of a conventional T-bracket on which the present display device holder may be removably secured; and, Fig. 9 is a sectional view taken along line 9—9 of Fig. 5.

To insert a display device in the holder comprising this invention, it is necessary merely to open the holder to approximately the position shown in Fig. 6, spread adjacent ends of one of the wire retaining elements 17, 18, place the display device within the hooked portions of the retaining element which are spread apart as shown in Fig. 7, release the ends of the element so that the hooked portions grip the display device, slide the display device over to the next pair of hooked ends, and repeat the foregoing steps. The display device may be horizontally centered manually. Vertical centering is accomplished automatically by the retaining elements.

It is believed apparent from the above description that the present invention facilitates insertion or removal of a display device and is further advantageous for the reason that it comprises a single unit which can be easily mounted or removed from a supporting bracket.

Obviously many modifications and variations of the present invention are possible in the light of the above teachings. It is therefore to be understood that within the scope of the appended claim the invention may be practiced otherwise than as specifically described.

I claim:

Means for removably supporting a display device comprising a backing plate, means supporting said backing plate, a display device supporting member mounted on the front face of the backing plate and including two identical U-shaped spring wire supporting elements, each having two resilient arms connected at one end by a bridge portion, the other ends of said arms being free and provided with display device engaging hook portions, a clamping plate clamping each supporting member to the backing plate, each clamping plate having a flat central portion which is located between the arms of the U-shaped supporting member closely adjacent the bridge thereof and which lies flatly against the backing plate and is rigidly secured thereto, the top and bottom edges of each clamping plate being deformed to overlie and embrace the arms of the corresponding supporting member, the two clamping plates being situated closely together and the arms of each supporting member extending in the opposite direction from those of the other supporting member.

References Cited in the file of this patent

UNITED STATES PATENTS

| | | |
|---|---|---|
| 651,357 | Howk | June 12, 1900 |
| 1,241,564 | Schreiber | Oct. 2, 1917 |
| 1,573,113 | Irie | Feb. 16, 1926 |
| 2,361,479 | Joffo | Oct. 31, 1944 |

FOREIGN PATENTS

| | | |
|---|---|---|
| 25,084 | Great Britain | Dec. 9, 1901 |